US011135686B2

(12) United States Patent
Vollebregt et al.

(10) Patent No.: US 11,135,686 B2
(45) Date of Patent: Oct. 5, 2021

(54) METHOD OF POSITIONING A HOLLOW WORKPIECE

(71) Applicant: SAFRAN AIRCRAFT ENGINES, Paris (FR)

(72) Inventors: Matthieu Jean Luc Vollebregt, Asnieres sur Seine (FR); Coralie Cinthia Guerard, Colombes (FR); Patrick Emilien Paul Emile Huchin, Tessancourt sur Aubette (FR); Joseph Toussaint Tami Lizuzu, Gonesse (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/015,916

(22) Filed: Jun. 22, 2018

(65) Prior Publication Data
US 2018/0369969 A1    Dec. 27, 2018

(30) Foreign Application Priority Data

Jun. 23, 2017    (FR) ..................... 17 55774

(51) Int. Cl.
*B23P 15/02*    (2006.01)
*F01D 5/18*    (2006.01)
(Continued)

(52) U.S. Cl.
CPC .............. *B23P 15/02* (2013.01); *B22C 9/064* (2013.01); *B22C 9/108* (2013.01); *F01D 5/18* (2013.01);
(Continued)

(58) Field of Classification Search
CPC ........... B23P 15/02; B23P 13/02; B23P 15/04; B23P 17/02; F01D 5/18; F01D 9/041;
(Continued)

(56) References Cited

U.S. PATENT DOCUMENTS 5,498,133 A * 3/1996 Lee ..................... F01D 5/186
416/97 R
9,387,533 B1 * 7/2016 Heneveld ............... F01D 5/18
(Continued)

FOREIGN PATENT DOCUMENTS

DE    10 2005 021 6    12/2005
EP       3 029 414 A1    6/2016

OTHER PUBLICATIONS

French Preliminary Search Report dated Dec. 8, 2017 in French Application 17 55774, filed on Jun. 23, 2017 (with English Translation of Categories of cited documents).

*Primary Examiner* — David P Bryant
*Assistant Examiner* — Nirvana Deonauth
(74) *Attorney, Agent, or Firm* — Oblon, McClelland, Maier & Neustadt, L.L.P.

(57)    ABSTRACT

A method is for positioning a hollow workpiece obtained by casting and that enables the workpiece obtained in this way to be machined in accurate manner. The workpiece is obtained by a casting method involving a mold and a sacrificial core inserted inside the mold and serving to form at least one cavity in the workpiece. The workpiece includes surfaces of a first type defined during casting by the surfaces of the mold, and surfaces of a second type defined during casting by the surfaces of the core. A frame of reference for positioning the workpiece is constructed that includes at least three reference points (P1-P3) belonging to surfaces of the second type of the workpiece.

15 Claims, 3 Drawing Sheets

(51) Int. Cl.
  *F01D 9/04* (2006.01)
  *B22C 9/06* (2006.01)
  *B22C 9/10* (2006.01)
  *F01D 5/20* (2006.01)
  *B22C 9/04* (2006.01)

(52) U.S. Cl.
  CPC ............ *F01D 5/187* (2013.01); *F01D 9/041* (2013.01); *B22C 9/043* (2013.01); *B22C 9/10* (2013.01); *F01D 5/20* (2013.01); *F05D 2230/10* (2013.01); *F05D 2230/21* (2013.01); *F05D 2230/64* (2013.01); *F05D 2230/68* (2013.01); *F05D 2240/12* (2013.01); *F05D 2240/30* (2013.01)

(58) Field of Classification Search
  CPC ............ F05D 2230/10; F05D 2230/21; F05D 2240/12; F05D 2240/30; B23B 2215/81; B23B 41/00; B23B 39/00; Y10T 29/49998; B25B 11/00; B25B 28/2811
  See application file for complete search history.

(56) References Cited

U.S. PATENT DOCUMENTS

| | | | | |
|---|---|---|---|---|
| 10,676,203 | B2* | 6/2020 | Porte | B64D 33/02 |
| 2005/0247425 | A1* | 11/2005 | Devine, II | B22C 9/10 |
| | | | | 164/76.1 |
| 2006/0229759 | A1* | 10/2006 | Luketic | B23K 26/384 |
| | | | | 700/166 |
| 2006/0277754 | A1* | 12/2006 | Rockstroh | G05B 19/4099 |
| | | | | 29/889.721 |
| 2010/0129554 | A1* | 5/2010 | Ahmad | F01D 5/187 |
| | | | | 427/289 |
| 2012/0034097 | A1* | 2/2012 | Marra | F01D 5/147 |
| | | | | 416/241 R |
| 2014/0010650 | A1* | 1/2014 | Zelesky | F01D 5/20 |
| | | | | 416/1 |
| 2017/0259327 | A1 | 9/2017 | Gill et al. | |
| 2018/0073373 | A1* | 3/2018 | Paquin | F01D 5/187 |

* cited by examiner

METHOD OF POSITIONING A HOLLOW WORKPIECE

FIELD OF THE INVENTION

The present disclosure relates to a method of positioning a hollow workpiece obtained by casting, which method enables the workpiece obtained in this way to be machined in accurate manner.

Such a method may be used for positioning any type of hollow workpiece obtained by casting, and most particularly workpieces of complex shape, in particular in the field of aviation: it may thus relate to hollow rotor blades or stator vanes, to mention just these examples.

STATE OF THE PRIOR ART

In the field of aviation, as in other fields, it is common practice to position and orient a workpiece by using a reference comprising a plurality of reference points on the walls of the workpiece that are selected for the purpose of machining the workpiece. Thus, by blocking the positions of the reference points, e.g. using tooling, the entire workpiece is blocked in a predetermined position and orientation, thus enabling machining such as drilling or cutting to be performed with precision, with margins of error that are very small.

Usually, the reference points are defined on raw surfaces of the workpiece as obtained by casting: knowing the dispersions in the dimensions and sizes of raw castings thus makes it possible to ensure sufficient accuracy for positioning and orienting the workpiece, and thus for machining it.

Nevertheless, such traditional positioning references reach their limits for hollow workpieces of complex shape. In particular, in the field of aviation, the shapes of certain hollow workpieces, and very particularly the shapes of cavities in such hollow workpieces, are becoming more and more complex in order to optimize their functions.

For example, FIG. 1 shows a hollow turbine blade 1. This blade has a complex network of cavities 10 of shapes that are designed to optimize the cooling of the blade 1 in service. The blades 1 may then include internal structures that are very thin, e.g. walls 11 of thickness that does not exceed 0.5 millimeters (mm).

However, some of those internal structures need to be subjected to machining, and in particular to drilling, e.g. in order to connect together certain cavities 10. For example, highly diagrammatic FIG. 3 shows a complicated situation in which an internal wall 11 lying between two cavities 10a and 10b needs to be drilled longitudinally in order to connect together two other cavities 10c and 10d.

It can thus immediately be understood that the workpiece needs to be subjected to positioning and orientation that are extremely accurate so that the hole 19 of great length does not depart from its theoretical path and does not pierce the wall 11 so as to open out into an unwanted cavity 10a or 10b.

The hollow workpieces are usually obtained by casting by using one or more sacrificial cores that are arranged inside the shell forming the mold prior to casting the molten metal. Thus, the real positions of the internal walls, such as the wall 11 in FIG. 3, depend on the positions of the cores inside the shell at the time of casting. However, it is rarely possible to be certain that a core is situated exactly in its theoretical position at the time of casting, since the core might have been positioned with a small margin of error or might possibly have been moved a little during casting, while still complying with dimensional tolerances. Under such circumstances, even if the margin of error is generally very small, typically less than 1 mm, it can lead to an offset between the frame of reference used for positioning the workpiece and the exact positions of the internal structures that is sufficient to run the risk of a defect during machining, e.g. when machining a particularly thin internal wall 11.

There thus exists a real need for a method of positioning a hollow workpiece obtained by casting, which method is unaffected, at least to some extent, by the drawbacks inherent to the above-specified known method.

SUMMARY OF THE INVENTION

The present disclosure relates to a positioning method for positioning a hollow workpiece obtained by casting, wherein said workpiece is obtained by a casting method involving a mold and a sacrificial core inserted inside the mold and serving to form at least one cavity in said workpiece, wherein said workpiece comprises surfaces of a first type defined during casting by the surfaces of the mold, and surfaces of a second type defined during casting by the surfaces of the core, and wherein a frame of reference for positioning the workpiece is constructed, which frame comprises at least three reference points belonging to surfaces of the second type of the workpiece.

Thus, the surfaces of the first type are the surfaces that, at the end of the steps of casting the metal and cooling the workpiece, were in contact with the wall of the mold, usually a shell made of refractory material: they thus generally constitute outside surfaces of the workpiece. Conversely, the surfaces of the second type are surfaces that, at the end of the steps of casting the metal and cooling the workpiece, were in contact with the sacrificial core, usually a ceramic core: they thus generally constitute inside surfaces of the workpiece.

Since these reference points belong to surfaces of the second type, their positions depend entirely on the position of the core during casting, such that this frame of reference points is associated directly with the shape of the cavities and of the inside walls of the workpiece. In other words, this frame of reference points makes it possible to locate and orient the internal structures of the workpiece accurately and directly without being subjected to any randomness in the positioning of the core during casting.

Thus, it is possible to use such a positioning frame of reference for positioning and orienting the workpiece so as to perform accurate machining operations on the internal structures of the workpiece: for example, it becomes possible to drill certain internal walls of the workpiece longitudinally while reducing, or even completely eliminating, any risk of the drilling departing from its theoretical path and passing through an unwanted portion of material or opening out into an unwanted cavity.

In addition, in this type of casting method using a sacrificial core, it is generally found at the end of cooling that the shrinkage of metal at the interface with the core is much less than the shrinkage at the interface with the mold, or is even completely non-existent. Thus, during cooling, the surfaces of the second type are subjected to much less dispersion than are the surfaces of the first type. Consequently, such a frame of reference points relying on surfaces of the second type is more accurate since there is less need to take account of dispersion in the dimensions of the workpiece during cooling.

Such a frame of reference also makes it possible to machine accurately the outside surfaces of the workpiece, which are of the first type, by ensuring that the theoretical dimensions relative to the internal structures of the workpiece are indeed complied with.

In certain embodiments, the positioning frame of reference comprises at least five reference points, preferably six reference points, belonging to surfaces of the second type of the workpiece. Six reference points make it possible to block all six degrees of freedom to move of the workpiece: its three degrees of freedom to move in translation and its three degrees of freedom to move in rotation.

In certain embodiments, the positioning frame of reference does not have any reference point belonging to surfaces of the first type of the workpiece. This avoids introducing positioning inaccuracies associated firstly with uncertainty in the positioning of the core in the mold, and secondly with the dispersion of the dimensions of the surfaces of the first type that occurs during cooling.

In certain embodiments, each reference point of the positioning frame of reference is situated on a surface that is locally plane. The term "surface that is locally plane" is used to mean a surface against which a setting member of tooling can be set in order to position and orient the workpiece. Typically, a plane surface having an area of about 5 square millimeters ($mm^2$) around said reference point suffices to enable such tooling to be set effectively.

In certain embodiments, all of the reference points of the positioning frame of reference are situated on final surfaces of the workpiece. The term "final surface" is used to mean a surface that is not going to be subjected to machining. Thus, there is no risk of the position of the reference point in question being affected by any machining of the workpiece that might locally modify the dimensions of the workpiece and thus generate an offset between the frame of reference points and the machined workpiece.

In certain embodiments, each reference point of the positioning frame of reference is accessible from outside the workpiece. More precisely, the term "accessible from outside the workpiece" means that a setting member of tooling can be positioned at and set relative to the reference points. There therefore exists a path, forming a passage with a section of at least 10 $mm^2$ and that connects the reference point in question to the outside of the workpiece. Preferably, the direction normal to the workpiece extending from a reference point of the frame of reference is unobstructed as far as the outside of the workpiece: in other words, this normal direction extends to the outside of the workpiece without encountering any obstacle belonging to the workpiece.

In certain embodiments, at least three reference points of the positioning frame of reference possess directions normal to the workpiece that are substantially co-linear with a first direction. The term "substantially co-linear with a given direction" is used to mean that the direction under consideration forms an angle of less than 10° with the given direction. This defines a plane against which the workpiece is constrained to take up a position by pushing the workpiece along the first direction.

In certain embodiments, at least two of the three reference points of the positioning frame of reference, and preferably each of these three reference points, are spaced apart by a distance of not less than 20%, preferably not less than 40%, of the greatest dimension of the workpiece in directions orthogonal to the first direction. In other words, when looking over all of the planes orthogonal to the first direction it is the greatest dimension of the workpiece that needs to be found. Specifically, the greater the distances separating these reference points from one another, the better the definition of the plane against which the workpiece is to be pressed, and thus the greater the accuracy with which the workpiece is positioned.

In certain embodiments, at least two reference points of the positioning frame of reference possess directions normal to the workpiece that are substantially co-linear with a second direction, the second direction forming an angle of greater than 45° with the first direction. This defines a straight line against which the workpiece is set by pushing it along the second direction, the workpiece also remaining set against the plane defined by the above-mentioned first three reference points.

In certain embodiments, these two reference points are spaced apart by a distance of not less than 20%, preferably not less than 40%, of the greatest dimension of the workpiece in directions orthogonal to the second direction.

In certain embodiments, at least one reference point of the positioning frame of reference possesses a direction normal to the workpiece that is substantially co-linear with a third direction, the third direction forming an angle of greater than 45° with the plane formed by the first and second directions. It is thus possible to set the workpiece against this reference point by pushing it along the third direction, the workpiece also remaining set against the plane and the straight line defined respectively by the three reference points and by the two reference points as mentioned above.

In certain embodiments, the core defines a wall of the workpiece having at least two faces that are surfaces of the second type. They may be two opposite faces. The present method is particularly useful when such a wall is to be drilled, most particularly when the drilling is longitudinal and of great length within the wall.

In certain embodiments, the thickness of said wall is less than 1 mm, preferably less than 0.5 mm.

In certain embodiments, the core has a plurality of distinct core elements.

In certain embodiments, at least three reference points, preferably at least five reference points, more preferably at least six reference points of the positioning frame of reference belong to surfaces of the second type defined, during casting, by a single core element.

In certain embodiments, the workpiece is a turbine engine blade or vane. It may be a movable blade, forming part of the rotor, or a stationary vane, forming part of the stator. In particular it may be a turbine blade or vane. Nevertheless, the present disclosure is equally applicable to any type of hollow workpiece.

In certain embodiments, said blade or vane has a leading edge, a trailing edge, a pressure-side wall, and a suction-side wall, a blade tip, and a blade root.

In certain embodiments, the blade tip includes a "bath tub" having a bottom wall and side walls.

In certain embodiments, at least one reference point of the positioning frame of reference, and preferably at least two reference points, is/are located on the inside surface of the suction-side wall at the trailing edge.

In certain embodiments, at least one reference point of the positioning frame of reference is located on the inside surface of the suction-side wall within the bath tab.

In certain embodiments, at least one reference point of the positioning frame of reference, and preferably at least two reference points, is/are located on the top end edge of the pressure-side wall, preferably at the bottom of a notch.

In certain embodiments, a reference point of the positioning frame of reference is located on the rear end edge of the pressure-side wall.

In certain implementations, the method further comprises a step of putting the workpiece into place on tooling, said tooling having as many setting members as there are reference points in the positioning frame of reference, a respective setting member being positioned on each of the reference points of the frame of reference for positioning the workpiece.

In certain implementations, said tooling is a machine tool, preferably for drilling.

The present disclosure also relates to a method of machining a hollow workpiece obtained by casting, the method including a positioning step in accordance with any of the above implementations, and a drilling step in which a hole is drilled in an internal wall of the workpiece having at least two surfaces that are faces of the second type. This drilling may extend over a length of at least 3 centimeters (cm), possibly at least 5 cm.

The above characteristics and advantages, and others, appear on reading the following detailed description of an implementation of the proposed method. The detailed description refers to the accompanying drawings.

BRIEF DESCRIPTION OF THE DRAWINGS

The accompanying drawings are diagrammatic and seek above all to illustrate the principles of the invention.

In these drawings, from one figure to another, elements (or portions of an element) that are identical are referenced by the same reference signs.

DETAILED DESCRIPTION OF EMBODIMENTS

In order to make the invention more concrete, an example positioning method is described below in detail, with reference to the accompanying drawings. It should be recalled that the invention is not limited to this example.

Figure 1:
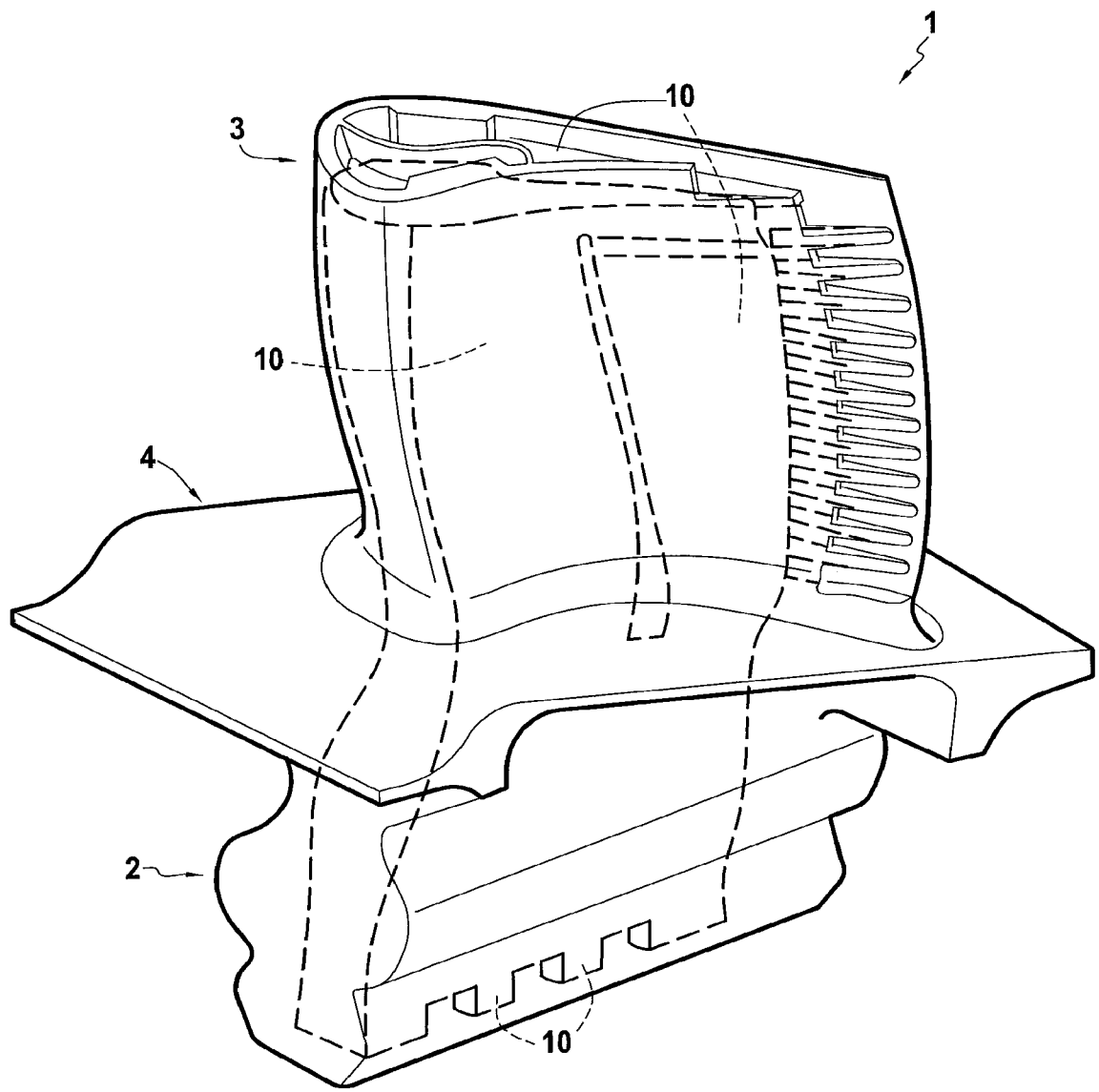
FIG. 1 is a perspective view of a hollow blade.

In this example, the positioning method relates to a hollow blade 1 for a high-pressure (HP) turbine of an airplane turbojet. The hollow blade 1 is shown in FIG. 1. In this example, it is a rotor blade comprising in a single piece a blade root 2 of dovetail shape enabling the blade to be fastened on the rotor disk of the turbine, an airfoil portion 3, and a platform 4 extending transversely between the blade root 2 and the airfoil portion 3.

Figure 2:
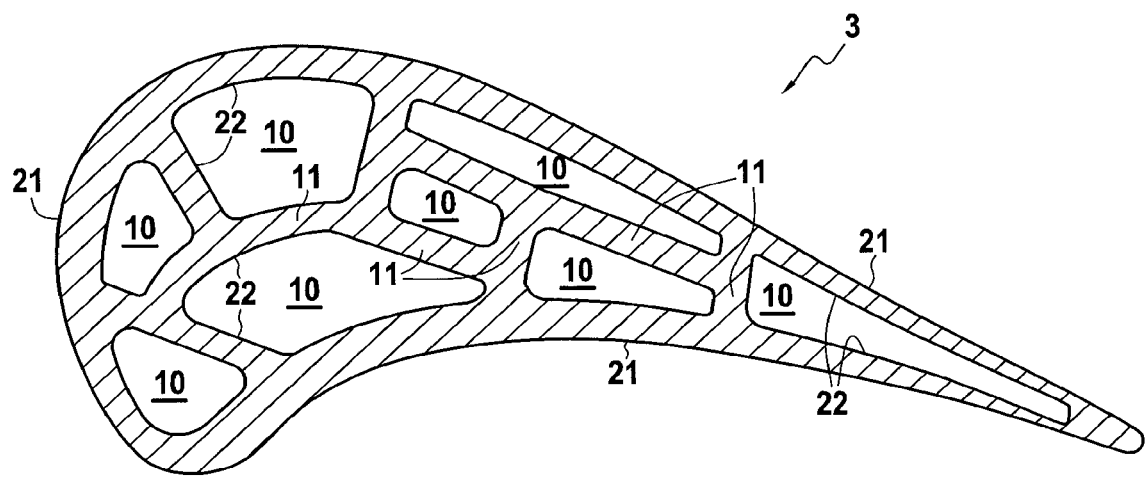
FIG. 2 is a cross-section view of such a hollow blade.

As can be seen more clearly in FIG. 2, which shows the airfoil portion 3 in cross-section, the blade 1 has a plurality of cavities 10 for passing a flow of a cooling fluid in the blade 1 in order to cool it while the turbojet is in operation. In conventional manner, cool air is injected into the blade 1 via a plurality of ducts passing through the blade root 2, and this cool air flows within the cavities 10 of the airfoil portion 3 and is discharged via small orifices formed in the outside walls of the airfoil portion 3, most particularly along its trailing edge.

Between them, these cavities 10 thus define internal walls 11 separating the various cavities 10.

Such a hollow blade can be fabricated using a conventional lost-wax casting technique by using a sacrificial core. It should be recalled that the main steps of such a method are as follows: making a first mold having the outside shape of the blade that is to be fabricated; installing a previously fabricated ceramic core of shape that corresponds to the negative of the shapes of the cavities in the blade to be fabricated; injecting wax into the mold and then cooling and obtaining a wax model of the blade that incorporates within it the ceramic core; coating the wax model with a slurry comprising a ceramic powder, while leaving feeder tubes; baking, discharging the molten wax, and obtaining a ceramic shell that forms a second mold, containing the ceramic core in position; casting a molten metal into the shell, followed by cooling and obtaining a metal blade containing the ceramic core; destroying the shell; and destroying the ceramic core, e.g. by means of a chemical bath, and obtaining the raw cast blade.

Thus, it is possible to define two different types of surface inside the raw cast blade. Surfaces 21 of a first type are surfaces that, while casting the molten metal, were defined, i.e. formed, by the surfaces of the shell. Conversely, surfaces 22 of a second type are surfaces that, while casting the molten metal, were defined, i.e. formed, by the surfaces of the core. Thus, in particular, the surfaces of the inside walls 11 separating the cavities 10 of the blade 1 are surfaces 22 of the second type.

Figure 4:
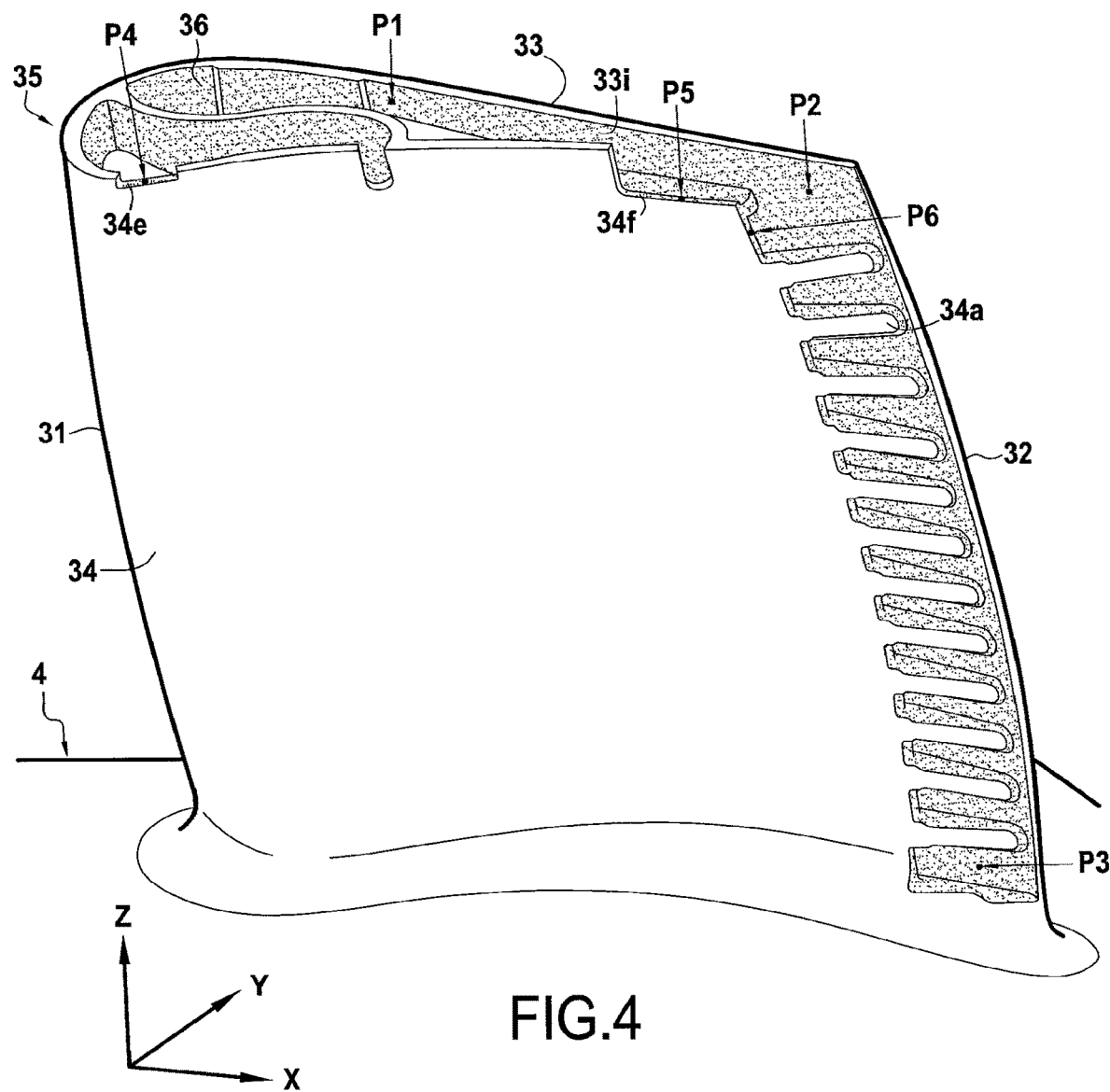
FIG. 4 is a perspective view of such a hollow blade provided with a positioning frame of reference.

A positioning frame of reference in accordance with the present disclosure is described below with reference to FIG. 4, which shows the airfoil portion 3 of the raw cast blade.

The airfoil portion 3 has a leading edge 31, a trailing edge 32, a suction-side wall 33, and a pressure-side wall 34. It extends between the platform 4 and a blade tip 35 having an indentation 36 sometimes referred to as a "bath tub". The pressure-side wall 34 has a notched rear portion 34a in the form of a comb, formed by using the core during casting, and leaving uncovered the inside surface 33i of the suction-side wall 33 in the proximity of the trailing edge 32.

In this figure, the surfaces of the first type are shown in white, while the surfaces of the second type are shown with a stippled texture.

The positioning frame of reference comprises six reference points P1-P6 that are all situated on surfaces of the second type.

The first three reference points P1-P3 are situated on the inside surface 33i of the suction-side wall 33. The first reference point P1 is situated within the bath tub 36, substantially in the middle thereof, in the front to rear direction X, defined by the chord of the blade 1, and in the proximity of the top edge of the suction-side wall 33. A member for setting tooling can easily access this reference point and can become positioned therein by penetrating into the bath tub 36 from the top of the blade 1.

The second reference point P2 is situated in the top rear corner of the inside surface 33i of the suction-side wall 33, in the proximity of the blade tip 35 and of the trailing edge 32. It is accessible via the bath tub 36 from the top of the blade 1, or indeed from its pressure-side face through the notched portion 34a of the pressure-side wall 34.

The third reference point P3 is situated in the bottom rear corner of the inside surface 33i of the suction-side wall 33, in the proximity of the platform 4 and of the trailing edge 32. It is accessible from the pressure-side face through the notched portion 34a of the pressure-side wall 34.

The surfaces on which these reference points P1-P3 are positioned are locally plane and they are oriented in such a manner that their normal directions are substantially co-linear with the pressure side to suction side direction Y of the blade 1, orthogonal to the front to rear direction X. Also, given their positions on the inside face 33i of the suction-side wall 33, there is no need for these surfaces to be machined.

The fourth reference point P4 is situated at the bottom of a notch 34e formed in the top edge of the pressure-side wall 34, in the proximity of the leading edge 31. By means of this notch 34e, which is formed using a portion of the core during casting, the blade tip 35 can be machined without that affecting the position of the fourth reference point P4, since the bottom of the notch 34e remains untouched.

The first reference point P5 is likewise situated at the bottom of a notch 34f formed in the top edge of the pressure-side wall 34, at the top rear angle thereof. By means of this notch 34f, which is formed using a portion of the core during casting, the fifth reference point P5 is preserved, even in the event of machining the blade tip 35.

The surfaces on which the reference points P4 and P5 are positioned are likewise locally plane and they are oriented in such a manner that their normal directions are substantially co-linear with the bottom to top direction Z of the blade 1, and orthogonal both to the front to rear direction X and also to the pressure side to suction side direction Y. Under such circumstances, these two reference points P4 and P5 are easily accessible directly from the top of the blade 1.

The sixth reference point P6 is situated on the rear edge of the pressure-side wall 34, in the proximity of its top end, in a notch of the notched rear portion 34a. Given this position, no machining is going to affect this sixth reference point P6.

The surface on which this reference point P6 is positioned is also locally plane and it is oriented in such a manner that its normal direction is substantially co-linear with the front to rear direction X of the blade 1. Under such circumstances, this reference point P6 is accessible easily and directly from the rear of the blade 1.

By means of such a positioning frame of reference, it is possible to position the blade 1 on a machine tool, e.g. for drilling, by setting the blade 1 against six setting members of the machine tool having their ends arranged to correspond with respective ones of the reference points P1-P6 of the positioning frame of reference.

Figure 3:
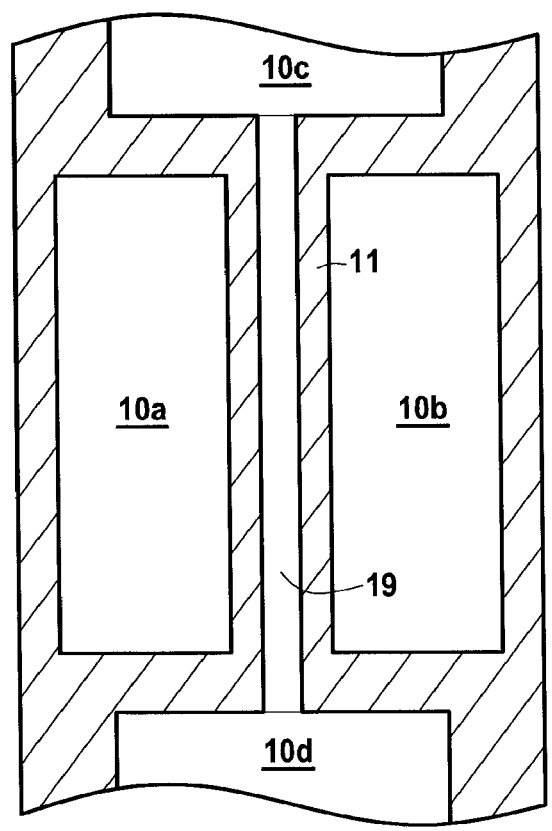
FIG. 3 is a diagrammatic longitudinal section view of such a hollow blade.

Once such setting has been performed, the position of the drill tool relative to the blade 1 is accurately known, thereby enabling very accurate holes to be drilled. For example, and as shown diagrammatically in FIG. 3, it is possible to make a hole 19 that passes longitudinally through an internal wall 11 of the blade 1 so as to connect together two distinct cavities 10c and 10d, while still ensuring some minimum amount of residual thickness between the hole 19 and the edge of the wall 11, preferably equal to 0.3 mm.

Although the present invention is described with reference to specific embodiments, it is clear that modifications and changes may be undertaken to those embodiments without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

It is also clear that all of the characteristics described with reference to a method can be transposed, singly or in combination, to a device, and vice versa, all of the characteristics described with reference to a device can be transposed, singly or in combination, to a method.

The invention claimed is:

1. A positioning method for positioning a hollow workpiece on tooling, the positioning method comprising:
    obtaining said workpiece by a casting method involving a mold and a sacrificial core inserted inside the mold and serving to form at least one cavity in said workpiece, wherein said workpiece comprises surfaces of a first type defined during casting by surfaces of the mold, and surfaces of a second type defined during casting by surfaces of the core;
    after the obtaining said workpiece, constructing a positioning frame of reference for positioning the workpiece on said tooling, said constructing said positioning frame of reference including identifying at least three reference points to place setting members of the tooling on, each of the at least three reference points belonging to the surfaces of the second type of the workpiece;
    the method further comprising, after the constructing said positioning frame of reference, putting the workpiece on said tooling, said tooling having as many of said setting members as there are said reference points in the positioning frame of reference, the putting the workpiece on the tooling including directly contacting a respective setting member of the tooling on each of the reference points of the positioning frame of reference of the workpiece.

2. The positioning method according to claim 1, wherein the positioning frame of reference comprises at least five reference points belonging to the surfaces of the second type of the workpiece.

3. The positioning method according to claim 1, wherein the positioning frame of reference does not have any reference point belonging to the surfaces of the first type of the workpiece.

4. The positioning method according to claim 1, wherein each of the reference points of the positioning frame of reference is situated on a surface that is locally plane.

5. The positioning method according to claim 1, wherein all of the reference points of the frame of reference are situated on final surfaces of the workpiece.

6. The positioning method according to claim 1, wherein the core defines a wall of the workpiece having at least two faces that are the surfaces of the second type.

7. The positioning method according to claim 6, wherein a thickness of said wall is less than 1 mm.

8. The positioning method according to claim 1, wherein the workpiece is a turbine engine blade or vane.

9. A method of machining a hollow workpiece obtained by casting, the method comprising:
    performing the positioning method according to claim 1, wherein said tooling is drilling tooling; and
    drilling a hole in an inside wall of the workpiece having at least two faces that are the surfaces of the second type.

10. The positioning method according to claim 1, wherein the positioning frame of reference comprises six reference points belonging to the surfaces of the second type of the workpiece.

11. The positioning method according to claim 1, wherein the tooling is configured to cut the workpiece.

12. The positioning method according to claim 1, wherein at least one of the reference points is positioned at a bottom of a notch formed in a top end of a pressure side wall of the workpiece.

13. The positioning method according to claim 12, wherein one of the reference points is positioned at a rear edge of the pressure side wall of the workpiece.

14. The positioning method according to claim 1, wherein all of the reference points where the setting members are placed on the workpiece are separate from a location where the tooling cuts or drills the workpiece.

15. The method according to claim 9, wherein the putting the workpiece on said tooling occurs before the drilling the hole begins.

* * * * *